May 10, 1932.  J. H. BAKER  1,857,802
PIPE WELDING MANDREL
Filed Jan. 5, 1929  3 Sheets-Sheet 1
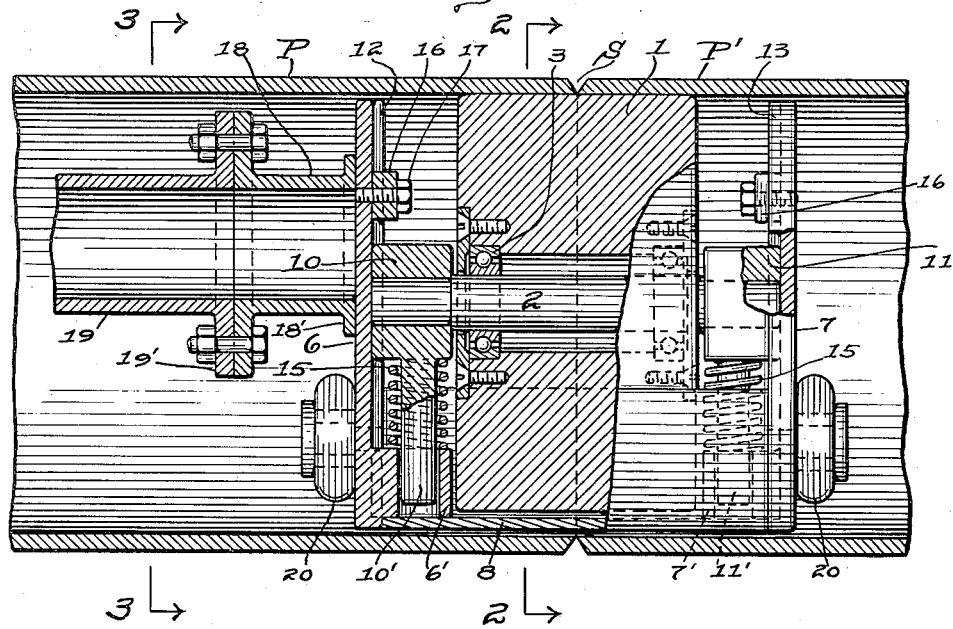
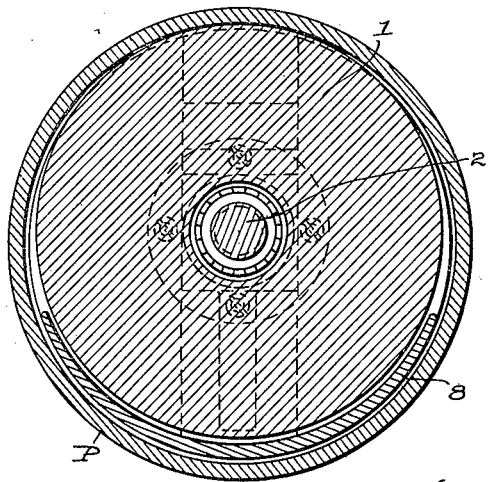
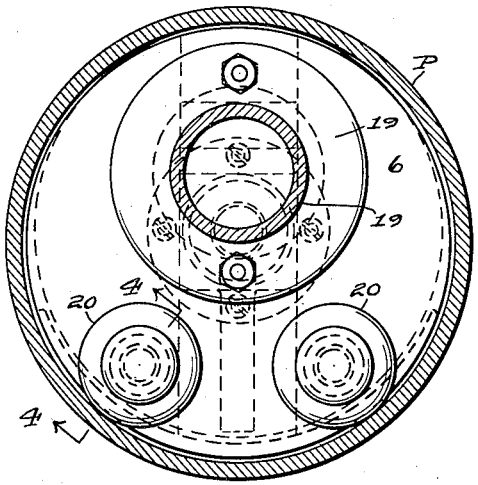
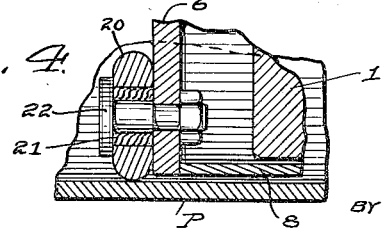
INVENTOR
John H. Baker.
WITNESS
F. J. Hartman
BY
ATTORNEYS

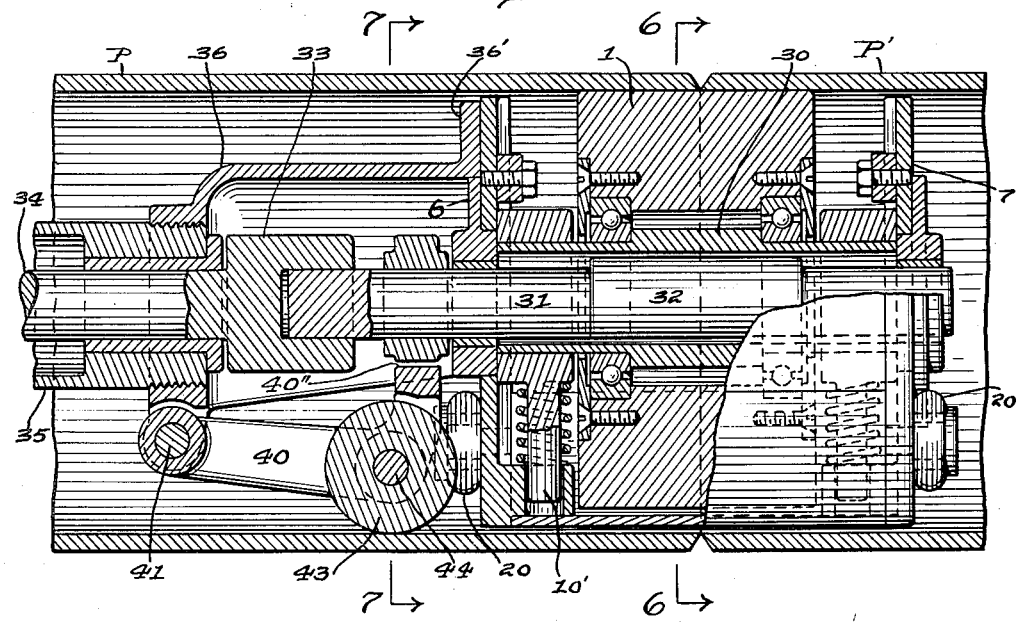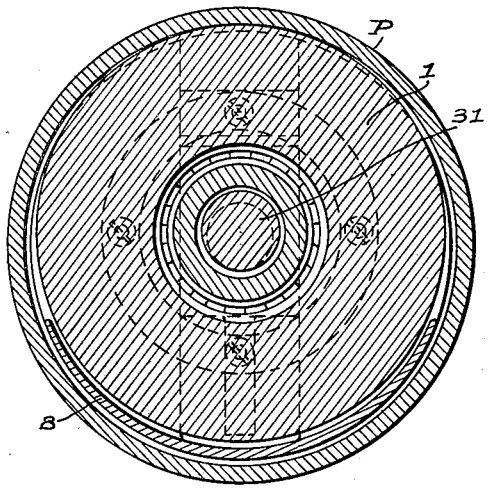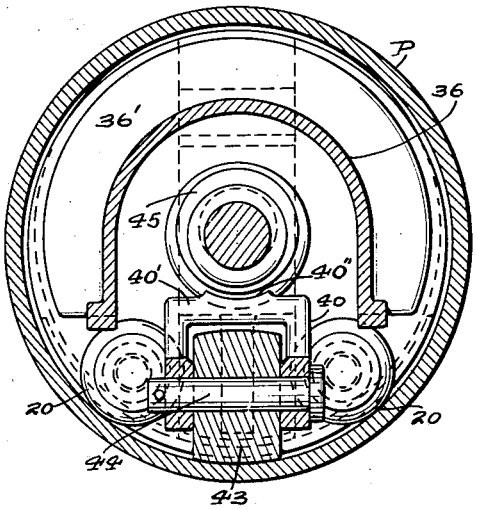

May 10, 1932. J. H. BAKER 1,857,802
PIPE WELDING MANDREL
Filed Jan. 5, 1929 3 Sheets-Sheet 3
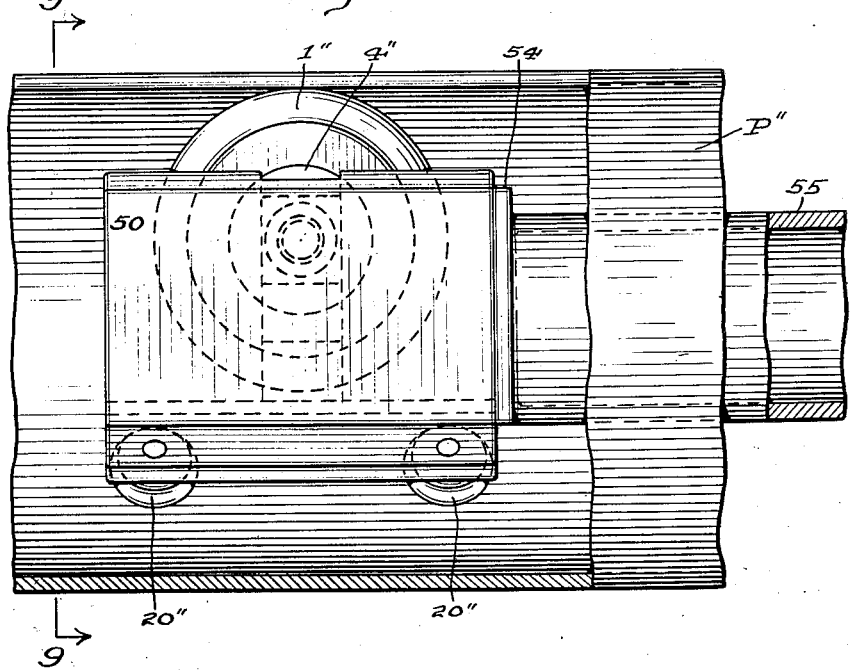
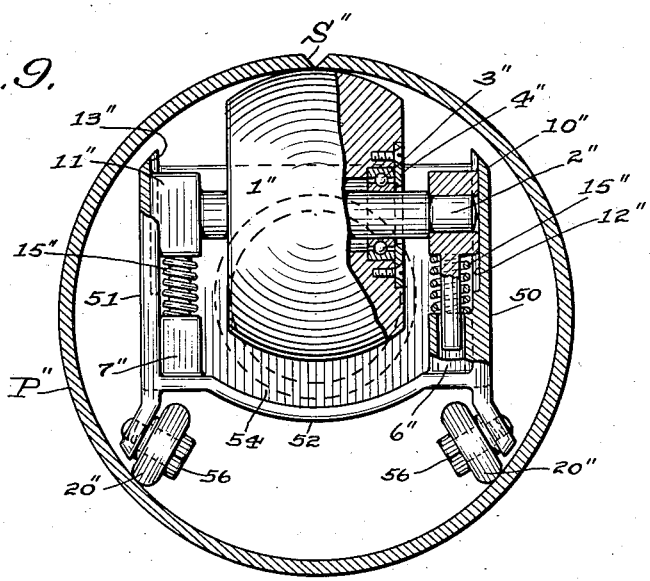
INVENTOR
John H. Baker.

Patented May 10, 1932

1,857,802

UNITED STATES PATENT OFFICE

JOHN H. BAKER, OF YOUNGSTOWN, OHIO, ASSIGNOR TO THE YOUNGSTOWN SHEET AND TUBE COMPANY, OF YOUNGSTOWN, OHIO, A CORPORATION OF OHIO

PIPE WELDING MANDREL

Application filed January 5, 1929. Serial No. 330,507.

When the ends of two lengths of pipe or tube are welded together so as to form a continuous double length pipe, the welding operation is ordinarily performed on the outside of the sections thereby producing an annular seam extending entirely around the pipe, while when a pipe is formed by bending up a flat piece of metal to cylindrical shape a longitudinally extending seam is produced at the abutting edges of the piece which is ordinarily likewise welded from the outside of the pipe. During the welding of either of these seams it is desirable to interiorly back up or support the pipe wall in the vicinity of the point where the welding operation is being performed and a principal object of my invention, therefore, is to provide a mandrel suitable for this purpose.

Further objects of my invention are to provide a mandrel for the purpose aforesaid embodying a rotatable element adapted to engage and support the pipe wall in the vicinity of the welding point and which, depending upon the particular kind of seam which is to be welded, may be either inserted in the outer end of one of the pipe sections prior to the welding operation and then pushed along therein until it reaches a point adjacent the opposite end and extends into the other pipe section so that the rotatable element will lie in the plane of the annular seam at the abutting ends of the sections and be thus operative to support the same, or which may be given a relative longitudinal movement with respect to and while within the cylindrical pipe blank in correspondence with the progressive welding of the longitudinal seam thereof so that the rotatable element will continuously occupy a proper relation to the welding point to afford the requisite support to the pipe wall in the vicinity thereof, the element in either case being freely rotatable with respect to the other parts of the mandrel so that it can turn with the pipe as the latter is rotated on its own axis while the annular seam is being welded or can roll along the interior of the cylindrical pipe blank as the longitudinal seam thereof is progressively welded, the mandrel also comprising means operative to constantly urge the rotatable element against the pipe wall with sufficient force to adequately support the same while the welding is being performed.

Still further objects of my invention are to provide a mandrel embodying the features and advantages to which I have referred yet which is of simple construction, contains but a relatively few parts, and is not likely to get out of order or become damaged under the conditions of use to which devices of this character are necessarily subjected.

My invention additionally includes other objects and novel features of design, construction and arrangement hereinafter more particularly pointed out or which will be apparent from the following description of certain embodiments of my invention as illustrated in the accompanying drawings and in which I have shown two forms of the invention adapted for supporting the pipe wall when an annular seam is being welded and one form of the invention adapted for supporting the pipe wall when a longitudinal seam is being welded.

Thus in the said drawings in Figs. 1 to 4 inclusive I have shown a form of my invention adapted for use in connection with the welding of an annular seam and which is of extremely simple design and construction and under many conditions of use will be found entirely satisfactory for the performance of its intended functions, while in Figs. 5 to 7 inclusive I have shown another form of the invention intended for similar purpose but which is slightly more complicated and therefore somewhat more costly although it embodies certain features and advantages which for certain purposes and under certain conditions sometimes render it more advantageous than the form illustrated in the preceding figures. In Figs. 8 and 9 I have shown still another form of the invention adapted for supporting the wall of a cylindrical pipe blank when the longitudinal seam formed at the longitudinal meeting edges of the blank is being welded. More particularly Fig. 1 is a central longitudinal section through the first of said forms of the invention in operative position adjacent the annular seam line at the abutting ends of two sections of pipe;

Fig. 2 is a transverse section on line 2—2 in Fig. 1; Fig. 3 is a similar section on line 3—3 in said figure and Fig. 4 a fragmentary detail section on line 4—4 in Fig. 3. Fig. 5 is a central longitudinal section of the second of said forms of the invention and generally corresponds to Fig. 1, while Figs. 6 and 7 are respectively transverse sections on lines 6—6 and 7—7 of Fig. 5. Fig. 8 is a somewhat fragmentary view, partially in central vertical section and partially in side elevation, showing the third of said forms of the invention in operative position in a cylindrical pipe blank while Fig. 9 is a transverse section on line 9—9 in Fig. 8 with certain portions of the mandrel broken away into vertical section to more clearly show internal construction. All of the sectional views are taken in the directions indicated by the arrows and like symbols of reference are employed to designate corresponding parts in the several figures.

Referring now more particularly to that form of the invention shown in Figs. 1 to 4 inclusive, the mandrel is shown disposed within two pipe sections P and P', the ends of which are ordinarily slightly beveled as shown, and which have been brought into abutting relation preparatory to their being united by welding around the annular seam-line S in the ordinary way, the mandrel, as hereinafter described, being effective to afford internal support to the walls of the sections adjacent this seam line and on opposite sides thereof in the vicinity of the point where the weld is to be made and which with the parts in the position shown in the drawings would be approximately at the highest point on the seam line.

The mandrel comprises a main roll 1, desirably of copper, of somewhat less diameter than the internal diameter of the pipe in which it is to be used. This roll is wide enough to adequately support the pipe sections on each side of the seam line and is bored for the passage of a roll shaft 2 on which the roll is rotatably mounted preferably by means of annular ball bearings 3, disposed near the ends of the roll and retained in position by keepers 4 or in any other convenient way. The roll and shaft are disposed between circular ends plates 6 and 7, also of somewhat less diameter than the internal diameter of the pipe, which are permanently joined together by a longitudinally extending transversely curved web 8 disposed between the plates below the center of the device and desirably welded to the plates so as to maintain the latter in parallel but longitudinally spaced relation; the end plates and web thus form a housing, closed at the ends and bottom and open at the top for the reception of the main roll and adjacent mechanism.

The ends of the shaft 2 are respectively supported in trunnions 10 and 11 which, in turn, are respectively vertically slidable in diametrically extending grooves 12 and 13 with which the inner faces of the end plates 6 and 7 are provided. The trunnion 10 carries a downwardly extending stem 10', and trunnion 11 a corresponding stem 11'; the lower ends of these stems respectively project slidably into vertically extending bores in lugs 6', 7' located adjacent the lower parts of the end plates 6 and 7 below the grooves 12 and 13. Around each trunnion stem between the trunnion and the upper face of the subjacent lug is disposed a coil spring 15 which is effective to continuously urge the trunnion, and in turn the shaft, upwardly away from the web 8 and thus move the main roll 1 relatively upward with respect to the end plates of the mandrel. To prevent the trunnions from sliding out of the upper ends of the grooves 12 and 13 should the mandrel be turned upside down when withdrawn from the pipe, stops 16 are secured within the grooves at a suitable distance above the trunnions by means of bolts 17 or in any other convenient way.

To enable the mandrel to be conveniently inserted in the pipe and withdrawn therefrom, the end plate 6 is provided with a bracket 18 welded or otherwise secured to its outer face and desirably provided with a flange 18' at its rear end for the reception of a corresponding flange 19' upon the forward end of the handle 19 which is preferably in the form of a tube of sufficient length to reach entirely through the pipe section and thereby enable the mandrel to be pushed into the section from the outer end until the roll 1 projects from the other end for about one-half its length as shown in Fig. 1 and is thus in proper position for operatively supporting the seam during the welding operation; after the latter has been completed the mandrel can be withdrawn from the pipe by means of the handle in the direction in which it was inserted.

For supporting the weight of the mandrel when it is within the pipe as well as for resisting the thrust of the roll 1, a pair of supporting rollers 20 are disposed upon each of the end plates adjacent its outer face. Each of these rollers is desirably mounted on a roller bearing 21 on a headed pin 22 extending through and rigidly secured to the adjacent end plate as best shown in Fig. 4, the rollers on each end plate being preferably located as best shown in Fig. 3, that is, on opposite sides of its vertical diameter and below its horizontal diameter when viewed as in said figure with the outer edge of each roller projecting slightly beyond the periphery of the plate, so that when the mandrel is inserted in the pipe the rollers will hold the end plate and web 8 slightly out of contact with the wall of the pipe below its horizontal diameter; since as heretofore pointed out, the end plates are of somewhat less diameter than the interior of the pipe, they will thus be out of contact with the inner wall thereof at all points so the roll 1 under the influence of springs 15 may be thrust upwardly sufficiently beyond the plates to contact with the inner wall of the pipe above its horizontal diameter. It will thus be observed that when viewed endways, as in Fig. 3, the various points of contact between the elements of the mandrel and the inner wall of the pipe are located substantially at the apices of an isosceles, triangle whereby the mandrel can readily accommodate itself to any inequalities in the surface of the pipe wall and assume the proper operative position therein at all times. It will further be apparent that as the roll 1 is free to turn with respect to the end plates and other relatively stationary parts of the device and that as the supporting rollers 20 are also free to turn with respect to these parts, the pipe can be readily revolved during the welding operation with corresponding rotation of the rollers 20 and roll 1 whereby the latter continuously follows the surface of the inner pipe wall against which it is yieldingly pressed at all times.

To minimize friction when inserting and withdrawing the mandrel from the pipe, the faces of the rollers 20 are preferably curved as shown in Figs. 1 and 4 so that no great amount of physical effort is required to push the mandrel through the pipe into operative position or to withdraw it therefrom, but of course during these movements the face of the main roll 1 necessarily scrapes along the inner wall of the pipe which results in a certain amount of damage to the roll particularly if the wall is rough or uneven. This difficulty is entirely obviated in the form of the invention shown in Figs. 5 to 7 inclusive and now to be described as in it means are provided for holding the roll out of contact with the pipe wall while the mandrel is being inserted and withdrawn and also means for relieving the rollers 20 from the weight of the mandrel during said movements so as to avoid the necessity of drawing them sideways along the pipe wall. For these reasons, among others, this form of the invention will frequently be preferred, particularly when the mandrel is designed for use in pipes of large diameter and consequently is relatively heavy.

As in this form of the invention the arrangements of the end plates, connecting web, trunnions, supporting shaft, main roll and supporting rollers are substantially similar to those heretofore described it will be unnecessary to refer to them in detail. However, in this form of the invention, the roll shaft 30 corresponding to the shaft 2 is hollow and surrounds a cam shaft 31 provided with a preferably integral cam 32 in alignment with the main roll. The cam shaft, moreover, is extended into and journaled in the end plates which, in order to adequately support the shaft, are preferably thickened at their centers, bored, and provided with bushings of anti-friction metal as clearly shown in Fig. 5. The cam shaft 31 projects rearwardly beyond the end plate 6 and is connected through the medium of a suitable coupling, generally designated as 33, with an operating shaft 34 which extends entirely through and is rotatable within the hollow mandrel handle 35 which, like the handle 19 already described, is of sufficient length to project beyond the outer end of the pipe section when the mandrel is in operative position adjacent the seam line S. The inner end of the handle, that is, the end adjacent the mandrel, may be threaded into an inverted U-shaped bracket 36 having a flange 36' at its forward end welded or otherwise secured to the rear of plate 6, the open side of the bracket being turned downward. Thus the cam shaft 31 can be rotated in either direction by corresponding rotation of the operating rod 35 and as cam 32 on the cam shaft 31 is cooperative with the inner wall of the hollow main roll supporting shaft and of such shape that when turned to the position shown in Figs. 5 and 7, it is entirely out of contact with the hollow shaft but when turned to the opposite position, that is, a position in which the high point of the cam is down, it will engage the hollow shaft and force the latter downward thereby correspondingly moving the trunnions downward against the springs 15, it will be apparent that by suitable manipulation of the operating rod the roll can be withdrawn from operative position and away from the wall of the pipe when desired so as to clear it from the same and hold it out of engagement therewith.

It will be noted from an inspection of Fig. 5 that when the main roll is in operative position with the high point of cam 32 turned upward, the axes of the cam shaft and the hollow shaft 30 are not coincident, the axis of the hollow shaft being disposed somewhat above the axis of the cam shaft but that when the cam is turned down so as to withdraw the roll from operative position, the axes of the hollow shaft and cam shaft are brought into substantial coincidence.

As the maximum diameter of cam 32 is less than the internal diameter of the hollow shaft 30, the latter, when the cam is turned upward, in no wise prevents the slight up- and-down movements sometimes required of the hollow shaft when the main roll is following a pipe having an uneven inner wall; likewise there is no interference with the action of the springs 15 in pushing the trunnions and hollow shaft upwardly for an amount amply sufficient to effect proper contact of the main roll with the pipe.

In this form of the invention means are also provided for relieving the rollers 20 from the weight of the mandrel while it is being inserted in and withdrawn from the pipe, said means being of such character as to automatically come into operation when the main roll is retracted from the operative position by movement of the cam 32 as well as to transfer the weight of the mandrel to the supporting rollers simultaneously with the reverse movement of cam 32 to its normal position in which the main roll is again free to move against the pipe. With these objects in view, I provide a vertically movable yoke 40 and pivot the same to the rear end of the bracket 36 beneath the handle on a transversely extending horizontal pivot 41 so that the yoke, extending forward toward the end plate 6, can move up and down about the pivot. Adjacent the forward end of the yoke between its arms is disposed a roller 43 rotatable on a transversely extending horizontal pivot 44 carried by the arms of the yoke which latter are tied together substantially above the roller by a bridge 40' having a cam surface 40'' in its upper face. Desirably the face of the roller 43 approximates the curvature of the wall of the pipe as best shown in Figs. 6 and 7.

Upon the rear end of the cam shaft 31, between its bearing in the end plate 6 and the coupling 33 is disposed a cam 45 having a high point in the same radial plane as the cam 32; this cam 45 is cooperative with cam surface 40'' on the yoke 40 in such manner that when the cam shaft 31 is rotated so as to move the high point of the cam beneath the shaft and into engagement with cam surface 40'' the whole mandrel will be raised relatively to the yoke 40 whose downward movement of course is limited by engagement of roller 43 with the pipe wall, thus moving the supporting rollers 20 out of engagement with said wall and transferring the entire weight of the mandrel to roller 43. Since the same movement of the cam shaft which is effective to disengage the supporting rollers 20 from the pipe as just described is also effective, through operation of cam 32, to draw the main roll out of contact with the pipe, the parts may thus be readily placed, by suitable manipulation of the operating rod 34, in a condition in which the mandrel can be very easily moved longitudinally of the pipe in either direction without scraping either the main roll or the supporting rollers 20 along its surface. Then after the mandrel has been inserted and moved inwardly to the desired point the operating rod 34 may be actuated to throw the high points of cams 32 and 45 upwardly thus simultaneously transferring the weight of the mandrel to the supporting rollers 20 and allowing the main roll to be projected outwardly into engagement with the pipe; similarly at the conclusion of the welding operation the actuating rod may again be manipulated so as to transfer the weight of the mandrel to the roller 43 as above described and withdraw the main roll 1 into the housing so that the mandrel can be readily removed from the pipe by pulling on the handle 35.

The form of the invention shown in Figs. 8 and 9 is, as hitherto stated, particularly adapted for supporting the wall of a cylindrical pipe blank P'' while the longitudinal seam formed between the abutting longitudinal edges of the blank is being welded and is thus intended to be entered at one end of the blank when the welding operation is commenced and either progressively moved along in the blank as the welding point is moved along the seam thereof, or else held in a stationary position beneath the welding point while the blank is moved longitudinally past the latter, relative movement thus taking place in either case between the blank and the mandrel as the welding progresses. As in the forms of the invention heretofore described the mandrel to which reference is now being made comprises a main roll 1'' adapted to engage the pipe wall beneath and in the vicinity of the seam line S'' but this roll instead of being rotatable on an axis parallel to the axis of the pipe is arranged for rotation on an axis transverse thereto.

More particularly the main roll 1'', which is desirably of copper, is mounted for rotation on a roll shaft 2'' preferably on annular ball bearings 3'' disposed near the end of the roll and retained in position by keepers 4'' or in any other convenient way. As in the case of the other forms of the invention, the ends of the roll shaft are extended into vertically movable trunnions 10'', 11'' respectively provided with downwardly extending stems slidably projecting into vertically extending bores in lugs 6'', 7'' secured to the side plates 50 and 51 of the mandrel frame approximately midway between the end thereof. These side plates extend at right angles to the axis of the roll shaft and lie in vertical planes on opposite sides of the main roll and are thus parallel to the axis of the pipe blank. Near their lower ends they are tied together by a transversely extending web 52 which is welded to the side plates and also forms a support for the lugs 6'', 7'', the side plates and web thus forming a housing for the roll. A coil spring 15'' is disposed around the stem of each trunnion between the latter and the upper end of the subjacent lug and is operative, as in the case of the other forms of the invention, to constantly urge its trunnion upwardly in a groove 12'' or 13'' formed in the adjacent side plate for the reception of the trunnion and in which the latter is freely slidable.

An end plate 54 is welded or otherwise secured across the rear end of the side plates so as to form a bridge therebetween and to this plate is welded the forward end of a tubular or other conveniently formed handle 55 which is long enough to extend entirely through the pipe blank and by means of which the mandrel can be readily inserted therein and moved there along during the welding operation.

The lower extremity of each side plate is turned angularly outward and to it are secured a pair of longitudinally spaced supporting rollers 20″, each roller being rotatably mounted upon a stud 56 threaded into the bent-out portion of the adjacent sideplate, the rollers on each side of the mandrel being respectively disposed adjacent the front and rear ends thereof. By reason of the fact that the lower portions of the side plates which carry the roller supporting studs are directed angularly outward from the major portions of the plates, the planes of revolution of the rollers are approximately radial of the pipe and, in consequence, the rollers have a better and more direct bearing on the pipe wall and tend to more firmly support the mandrel therein as the relative longitudinal movement between the mandrel and the pipe blank takes place during the welding operation than would be the case if said planes of revolution were parallel to that of the main roll 1″.

Since the several rollers 20″ at all times afford a satisfactory support for the mandrel whether the same be within the pipe blank or withdrawn therefrom and resting on a supporting surface there is but little danger of the mandrel being turned over to a position in which the trunnions could slide out of the grooves 12″, 13″ so that the stops 16 or equivalent means can ordinarily be safely omitted; should it be deemed advisable however, stops or equivalent means may be secured in the upper end of the grooves above the trunnions to prevent the latter from falling out of the frame should the mandrel be inverted.

In use, the form of mandrel to which reference has just been made is simply inserted in the end of the formed-up pipe blank and pushed longitudinally forward until the main roll 1″ is brought beneath the welding point in the seam S″ and thereafter progressively moved ahead in the pipe blank as the welding point travels along the seam to thereby support the pipe wall in the vicinity of the seam as the welding progresses, or else the pipe blank is moved longitudinally past the mandrel and welding point so as to achieve the same result and as in the case of the other forms of the invention heretofore described, the main roll throughout the welding operation is continuously pressed into engagement with the pipe wall by the springs on which the trunnions are supported and can also freely rotate throughout the relative movement of the pipe blank and mandrel.

It will be understood that certain terms herein employed to define relative location and direction of movement of various parts of the mandrel when the latter is disposed as shown in the drawings have been used merely for convenience of description and not in a limiting or restrictive sense, and that while I have described and illustrated certain forms of my invention with considerable particularity as the same have been found satisfactorily operative for the performance of their intended functions under practical operating conditions and will therefore ordinarily be preferred, I do not thereby desire or intend to specifically limit myself thereto nor to any precise details in the design, construction and arrangement of the various elements thereof as numerous changes and modifications may be made therein if desired without departing from the spirit and scope of the invention as defined in the appended claims.

Having thus described my invention I claim and desire to protect by Letters Patent of the United States:

1. A mandrel of the class described, comprising a housing having parallel end plates longitudinally spaced and of less diameter than the pipe in which the mandrel is to be used, means connecting the plates together below the horizontal diameter of the mandrel, a roll disposed between the plates, a shaft on which the roll is mounted for revolution on an axis normal to the plates, a trunnion at each end of the shaft movable diametrically of the adjacent plate, yielding means operative to move each trunnion upwardly to engage the roll with the inner wall of the pipe when the mandrel is disposed therein, supporting rollers carried by each plate on opposite sides of its vertical diameter adapted to support the mandrel in the pipe with the plates and plate connecting means out of contact with the wall thereof and to resist the thrust of the roll as it is pressed against the pipe wall by said yielding means.

2. A mandrel of the class described, comprising a housing having parallel end plates longitudinally spaced and of less diameter than the pipe in which the mandrel is to be used, means connecting the plates together below the horizontal diameter of the mandrel, a roll disposed between the plates, a shaft on which the roll is mounted for revolution on an axis normal to the plates, a trunnion at each end of the shaft movable diametrically of the adjacent plate, yielding means operative to move each trunnion upwardly to engage the roll with the inner wall of the pipe when the mandrel is disposed therein, supporting rollers carried by each plate on opposite sides of its vertical diameter adapted to support the mandrel in the pipe with the plates and plate connecting means out of contact with the wall thereof and to resist the thrust of the roll as it is pressed against the pipe wall by said yielding means, and a handle carried by one of the plates for inserting the mandrel into and withdrawing it from the pipe.

3. A mandrel of the class described, comprising a housing having an opening and adapted for insertion in a pipe, a roll journalled for rotation relative to the housing on an axis substantially parallel to that of the pipe, means carried by the housing adapted to engage the pipe at spaced points to support the housing therein in spaced relation with the pipe wall, means for yieldingly urging the roll radially outward through the opening in the housing into engagement with the pipe wall and means operable to move the roll in the opposite direction in opposition to the yielding means to withdraw it from engagement with said wall.

4. A mandrel as specified in claim 3 in which the means operable to move the roll in opposition to the yielding means comprise a rotatable cam and means for actuating said cam from a point remote from the mandrel.

5. A mandrel as specified in claim 3 in which the main roll is rotatably mounted on a hollow shaft within the housing and the means for moving the roll in opposition to the yielding means comprise a rotatable cam disposed within said hollow shaft and means for rotating the cam from a point remote from the housing.

6. A mandrel of the class described, comprising a housing having longitudinally spaced end plates, a main roll disposed between said plates, a hollow shaft extending through the roll, trunnions on opposite sides of the roll forming journals for the ends of the hollow shaft, yielding means cooperative with each trunnion adapted to continually urge the trunnion radially outward with respect to the adjacent end plate to thereby move the roll into engagement with the pipe wall when the mandrel is disposed within a pipe, and means for moving the hollow shaft in opposition to said yielding means so as to withdraw the roll from engagement with the pipe and hold it within the housing comprising a cam shaft extended through the hollow shaft and journalled in the end plates, a cam on the shaft, and means for rotating the shaft from a point remote from the mandrel to thereby engage the cam with the interior of the hollow shaft to move the latter radially inward relatively to the plates.

7. A mandrel of the class described, comprising a pair of longitudinally spaced end plates, means for holding said plates in parallel relation, a roll disposed between said plates, a shaft on which said roll is rotatably mounted, means carried by said plates operative to engage the pipe wall at the spaced points to normally support the weight of the mandrel when disposed in a pipe, yielding means adapted to move the shaft outwardly relatively to the plates, means cooperative with said shaft operable to move the shaft inwardly in opposition to said yielding means and means operative through actuation of last mentioned means for throwing said pipe wall engaging means out of engagement with the pipe wall and thereafter supporting the mandrel within the pipe.

8. A mandrel of the class described, comprising a housing adapted for insertion in a pipe, a roll rotatably mounted within the housing, yielding means operative to project the roll outwardly from the housing into engagement with the pipe wall, means operable to retract the roller into the housing in opposition to said yielding means, means carried by the housing for normally supporting the mandrel in the pipe by engagement with its wall, a roller disposed adjacent the housing and means operable to transfer the weight of the mandrel from said supporting means to the roller and thereby disengage said supporting means from the pipe wall, said means being interconnected with said roll retracting means and concurrently operative therewith.

9. A mandrel of the class described, comprising a housing adapted for insertion in a pipe, a roll rotatably mounted within the housing, means operative to yieldingly project the roll outwardly from the housing and into engagement with the wall of a pipe when the mandrel is disposed therein, means carried by the housing for normally sustaining the weight of the mandrel and supporting it within the pipe by engagement with the wall thereof, means operable from a point remote from the housing for retracting the roll into the housing in opposition to said yielding means, and means interconnected with said roll retracting means adapted to throw the housing supporting means out of engagement with the pipe wall when the roll is retracted from engagement therewith comprising a roller pivoted on an axis normal to the axis of the pipe and adapted to sustain the weight of the mandrel when said mandrel supporting means are out of engagement with the pipe wall and means for raising the housing relatively to the roller.

10. A mandrel of the class described, comprising a housing, a roll disposed within the housing, a hollow shaft on which the roll is journaled, means for normally urging the hollow shaft in a direction to project the roll outwardly from the housing and into engagement with the pipe wall when the mandrel is disposed therein, spaced rollers carried by the housing and rotatable on axes parallel to that of the pipe for normally supporting the mandrel within the pipe by engagement with its wall, a cam shaft extending into said hollow shaft and rotatable from a point remote from the housing, a cam on said cam shaft operable by rotation of the shaft to move the hollow shaft inwardly in opposition to said yielding means to retract the roll from engagement with the pipe, a roller pivotally supported adjacent the housing, rotatable on an axis normal to the axis of the pipe and adapted to normally lie in engagement therewith and a cam carried by said cam shaft and adapted when the shaft is rotated so as to retract the roll to lift the housing relatively to said pivoted roller so as to disengage the spaced rollers carried by the housing from the pipe wall and transfer the weight of the mandrel to said pivoted roller.

11. A mandrel of the class described, comprising a housing adapted for insertion in a pipe, supporting rollers carried by the housing, rotatable on axes parallel to the axis of the pipe and adapted to operatively support the mandrel in the pipe, a roller disposed adjacent the housing and rotatable on an axis transverse to that of the pipe and means operable from a point remote from the housing when the latter is in the pipe for lifting the housing relatively to the last mentioned roller to thereby throw the weight of the mandrel thereonto and simultaneously disengage the supporting rollers from the pipe.

12. A mandrel of the class described, comprising a housing having spaced plates and means for holding said plates in parallel relation, a roll disposed between the plates, a shaft on which the roll is revolubly mounted, means carried by the plates operative to engage the pipe wall at spaced points to support the weight of the mandrel when disposed in a pipe, trunnions movable with respect to the plates and operative to support the ends of the shaft and a spring adjacent each trunnion operative to urge the trunnion in a direction to cause the roll to engage the pipe wall when the mandrel is disposed in a pipe.

13. A mandrel of the class described comprising a pair of spaced plates, means for holding said plates in parallel relation, a roll disposed between said plates, a shaft on which said roll is revolubly mounted, means carried by said plates operative to engage the pipe wall at spaced points to support the weight of the mandrel when disposed in a pipe, and means cooperative with said shaft adapted to yieldingly move the shaft radially of the plates, and to thereby press the face of the roll against the wall of the pipe, said last mentioned means comprising a trunnion adjacent each end of the shaft and guiding means carried by each plate adjacent each trunnion adapted to constrain the trunnion to move in a predetermined path.

14. A mandrel of the class described comprising a pair of spaced plates, means for holding said plates in parallel relation, a roll disposed between said plates, a shaft on which said roll is revolubly mounted, means carried by said plates operative to engage the pipe wall at spaced points to support the weight of the mandrel when disposed in a pipe, and means cooperative with said shaft adapted to yieldingly move the shaft radially of the plates, and to thereby press the face of the roll against the wall of the pipe, said last mentioned means comprising a trunnion adjacent each end of the shaft, means carried by the adjacent plates adapted to guide the trunnion in a right line and a spring operative to urge each trunnion in a direction to cause the roll to engage the pipe wall.

15. A mandrel of the class described comprising a housing, a substantially cylindrical roll carried by and journaled for rotation with respect to the housing, means carried by the housing operative to engage a pipe wall at spaced points to support the weight of the mandrel when disposed in a pipe, and means comprising a roll shaft, a trunnion adjacent each end of the shaft, guiding means for the trunnions and resilient means forming supports for the trunnions, operative to yieldingly urge the roll outwardly from the housing and against the pipe wall when the mandrel is so disposed.

In witness whereof, I have hereunto set my hand this 3rd day of January, 1929.

JOHN H. BAKER.